United States Patent [19]

Müller

[11] 4,211,963
[45] Jul. 8, 1980

[54] BRUSHLESS, PERMANENT MAGNET D-C PULSE CURRENT CONTROLLED, ESSENTIALLY UNIFORM TORQUE DYNAMO ELECTRIC MACHINE, PARTICULARLY MOTOR

[75] Inventor: Rolf Müller, St. Georgen, Fed. Rep. of Germany

[73] Assignee: Papst-Motoren KG, St. Georgen, Fed. Rep. of Germany

[21] Appl. No.: 919,702

[22] Filed: Jun. 27, 1978

[30] Foreign Application Priority Data

Jul. 4, 1977 [DE] Fed. Rep. of Germany ....... 2730142

[51] Int. Cl.² .......................................... H02K 29/02
[52] U.S. Cl. .................................. 318/254; 318/138; 310/268
[58] Field of Search ................. 318/254, 138; 310/46, 310/68 R, 268

[56] References Cited

U.S. PATENT DOCUMENTS 3,299,335  1/1967  Wessels ............................... 318/138
3,354,329  11/1967  Reich ..................................... 310/36

*Primary Examiner*—J. V. Truhe
*Assistant Examiner*—John W. Redman
*Attorney, Agent, or Firm*—Frishauf, Holtz, Goodman & Woodward

[57] ABSTRACT

A permanent magnet motor designed for d-c operation with pulsed current supply through at least two, and preferably four or more stator coils, has a rotor magnetized such that, with respect to 180°-electrical, about 120° are magnetized in one magnetic polarity, and the remaining about 60° are magnetized with dual polarity to provide a monopole zone of magnetization and a dipole zone of magnetization, a galvano-magnetic sensing element being exposed to the path of circumferential rotation in which the same polarities of the dipole and monopole zones are contiguous for control of pulse current flow through the windings of the motor. A tacho generator winding may additionally be included in the air gap, exposed only to the rotary path of one magnetic pole of the dipole zone and the monopole zone.

30 Claims, 18 Drawing Figures

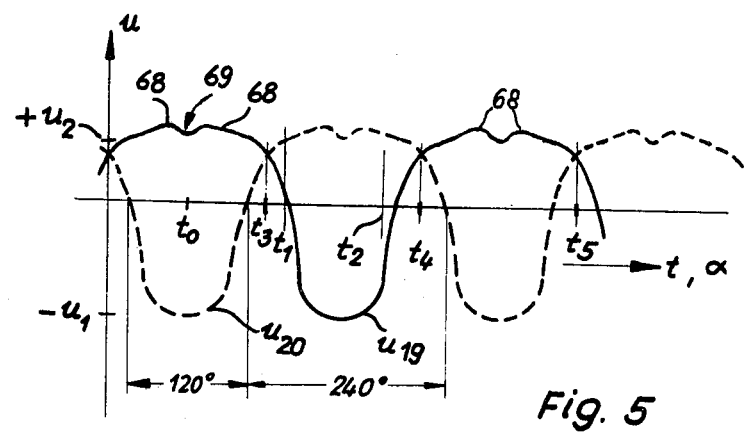
Fig. 5
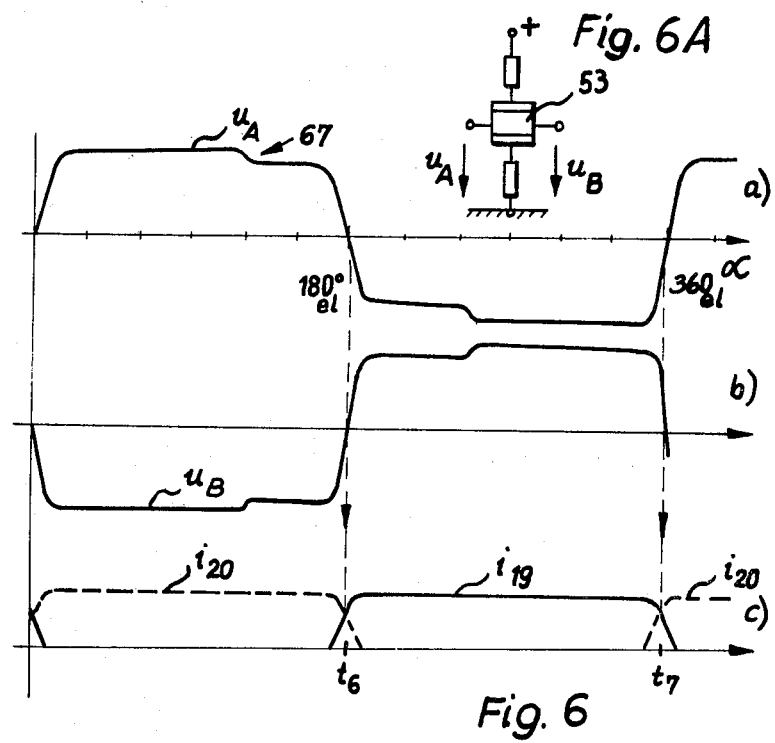
Fig. 6A
Fig. 6

BRUSHLESS, PERMANENT MAGNET D-C PULSE CURRENT CONTROLLED, ESSENTIALLY UNIFORM TORQUE DYNAMO ELECTRIC MACHINE, PARTICULARLY MOTOR

The present invention relates to a brushless d-c dynamo electric machine, and more particularly to a motor construction in which the rotor and the stator are so arranged that the output torque derived from the motor is essentially uniform over its entire angular range of rotation.

Background and Prior Art

Brushless d-c motors are widely known and readily made. A motor of the general type to which the present invention relates is described in U.S. Pat. No. 3,873,897, assigned to the assignee of the present application. Such a motor has a permanent magnet rotor which reacts with electric current applied in pulses, selectively, to either one of two winding groups—in which the winding groups may well have only a single winding—so that current flow through the respective winding groups interacts with a selected pole of the rotor. The current is alternatingly supplied, in pulses, unidirectionally, to the respective windings under control of switching circuits, for example control transistors.

The motor of U.S. Pat. No. 3,873,897 is efficient in utilization of the magnetic material present therein and requires only a simple and hence inexpensive electronic control circuit. Only a single electromagnetic control element, typically a Hall generator is used, located within the field of the rotor magnet and controlled thereby. This Hall generator, thus, is positioned in the air gap of the motor so that no special space is required therefor. The drive power for the motor is provided by current pulses selectively steered through the respective coils or groups of coils by the transistor switching circuit. The current pulses provide interrupted drive power; to render the output torque of the motor essentially uniform, an additional auxiliary torque, that is, a reluctance torque, is provided. This reluctance torque is matched to the overall, essentially uniform torque to be derived from the motor. Without such a reluctance torque, the output torque derived from the motor would occur in interrupted pulses, that is, have gaps therebetween. Such gaps in output torque are not desirable in many applications, and in some must be definitely prevented.

A brushless d-c motor which does not utilize a reluctance torque is described in U.S. Pat. No. 3,299,335. To provide for commutation control, an optical sensing system is provided. Actual operating experience has shown that optical sensing of position of a rotor in a motor is less reliable than galvano-magnetic sensing means, typically a Hall generator. If a galvano-magnetic rotor position sensing element were to be used in the motor of U.S. Pat. No. 3,299,335 to provide for more reliable commutation, then an additional permanent magnet rotor would be required, which would be undesirable due to the increase in motor size and consequent added cost.

The Invention

It is an object to provide a brushless d-c motor of the general basic construction of the aforementioned U.S. Pat. No. 3,873,897 and which can provide essentially uniform output torque throughout its entire angular range of rotation and independently of torque requirements placed on the motor; in other words, without any requirements of matching the design of the motor to a specific output torque. The motor, thus, will provide a driving torque substantially free from gaps and with good uniformity, throughout a design range of output torque, while additionally having the advantage of an inexpensive and reliable commutating arrangement and simple circuit means to provide for commutation of the motor current.

Briefly, the rotor of the motor is so constructed that, with respect to a right angle to the direction of rotation of the rotor, the magnetization is divided into two zones; in a first zone, the magnetization of the rotor is in one polarity only; in an adjacent zone, the magnetization of the rotor has two radially adjacent opposite zones of magnetization—all with respect to a direction at right angle to the direction of rotation of the motor.

For ease of discussion, the term "monopole magnetization" will be used for that zone of magnetization of the rotor which is magnetized in accordance with one pole only; and "dipole magnetization" for the adjacent zone at which, with respect to a right angle to the direction of rotation, the magnetization includes two oppositely poled regions of magnetization.

The particular construction permits use of a galvanomagnetic element, typically a Hall generator, positioned in the air gap of the motor in such a way as to be affected by the monopole zone of magnetization, to then, preferably, produce output control signals which control a switching circuit, typically including switching transistors which steer current to either one of two coils, or groups of coils, in respective directions, to interact with the magnetic fields from the rotor.

The angular ranges of the respective monopole and dipole zones are preferably so selected that the monopole range extends over approximately 120°-el, and the dipole range over approximately 60°-el. At the next subsequent 180°-el, a second monopole zone, of opposite polarity to that of the first monopole zone, will be positioned, and thereafter a second dipole zone, in which the relative position of the poles of the dipole zone are spatially reversed with respect to that of the first dipole zone.

Upon rotation, the output torque of the motor with this unusual rotor will be essentially uniform and free of gaps. The mechanical construction of the motor can be inexpensive and simple. The motor requires only two windings, or groups of windings, which are controlled from a single galvano-magnetic element, typically a Hall generator. Thus, its construction with respect to control circuitry is also simple and inexpensive. The electromagnetically generated torque will be matched automatically to the loading of the motor, that is, the motor can be operated in the manner of the well-known multi-phase, multi-pulsed, brushless d-c motors—for example as defined in the ASR Digest literature reference. The motor can thus be used to drive loads which require uniform output torque which, however, may vary within rather wide limits. The electromagnetic drive torque will have a high degree of uniformity so that the motor can be used for drives of audio equipment, for example turntables, tape recorders, or the like, for video tape applications, and other drives in which wow and flutter of the resulting drive are highly undesirable.

In a preferred form of the invention, the motor has four or more poles. Axial air gap motors are preferably so constructed that the stator winding is core-or ironless; motors having a cylindrical air gap, whether of the internal rotor or external rotor type, preferably use a stator which is not slotted, that is, which is smooth, in order to avoid any possible arising reluctance torques which may disturb smooth operation of the motor.

Variations in output torque of the motor throughout its angular range of rotation can be essentially completely eliminated by suitable shaping of the coils; in accordance with a preferred form and a feature of the invention, the stator coils have their corners chamfered, that is, the geometric area taken up by the coils along the edges has been reduced in the region where they extend above the path of the rotor in which the dipole zones are located which have the same polarity as the next adjacent monopole zones.

In accordance with another feature of the invention, the motor can be additionally supplied with a tacho generator winding, located in the air gap of the motor. Preferably, such a tacho generator winding is supplied in form of a printed circuit, printed on an insulating foil which, in operation, provides an undulating output voltage having a frequency which is a multiple of the frequency induced in the motor winding by the rotating rotor magnet itself. The output of such a tacho generator winding can then be used simply and easily to control a speed control circuit which, in dependence on the frequency of the signal from the tacho generator winding, controls the speed of the motor. A plurality of such foils with printed tacho generator winding can be used, offset 180°-el/n with respect to each other (wherein n is the number of foils), thereby further increasing the output frequency by, effectively, providing a multiphase system which, after full-wave rectification and, if necessary, preamplification, provides a d-c output voltage with an a-c ripple of relatively high frequency.

Drawings, illustrating preferred examples, and graphs:

FIG. 5 is a graph of motor voltage induced in the coils with respect to time;

FIG. 6 is a graph of Hall generator voltages and motor current with respect to time;

FIG. 6A is a schematic representation of a Hall generator circuit generating the voltages and controlling the currents of FIG. 6;

FIG. 13 is a developed view of the rotor of FIG. 12, with the stator coils being schematically shown;

Figure 1:
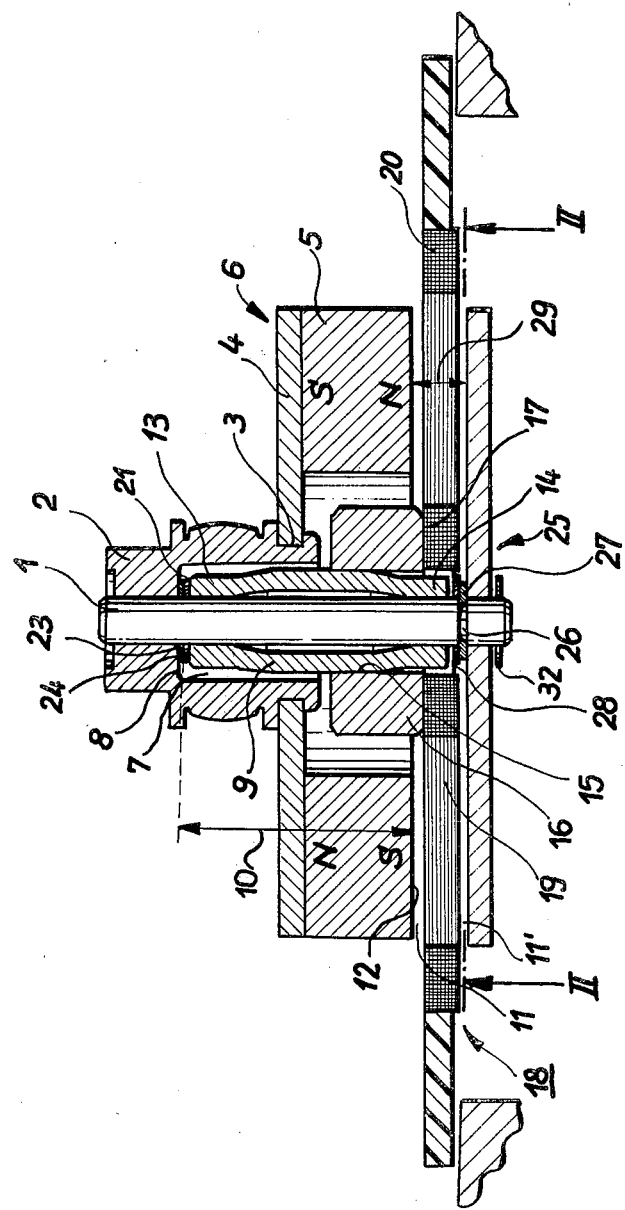
FIG. 1 is a longitudinal section through a first embodiment of a brushless d-c motor having a flat, axial air gap.
Figure 2:
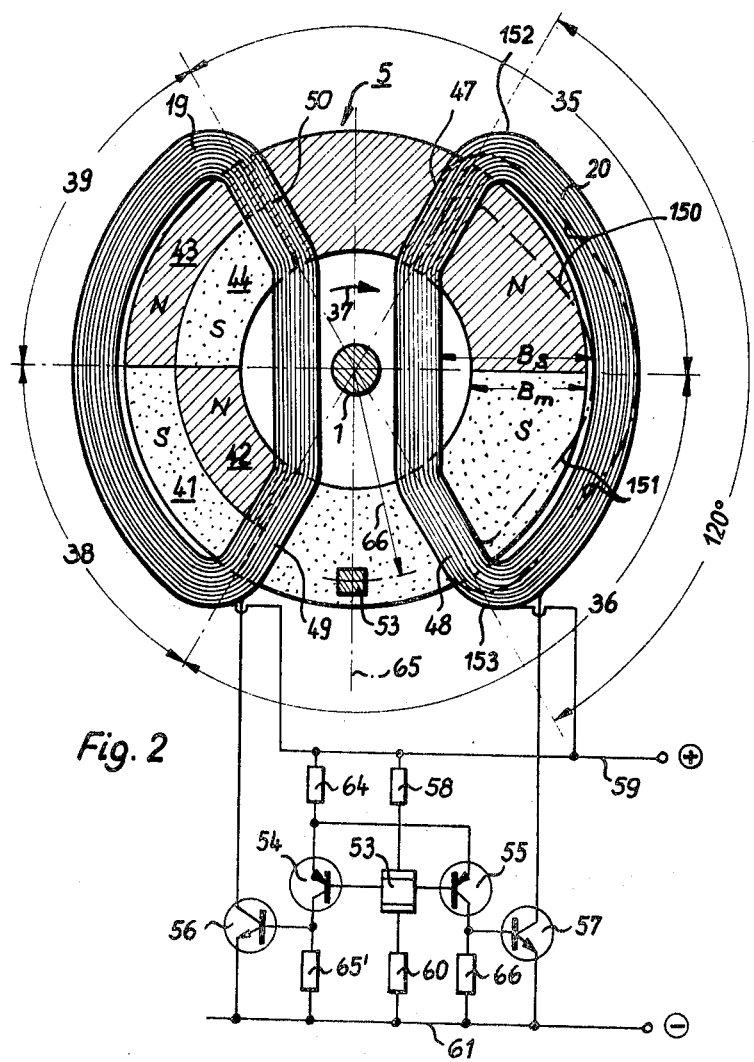
FIG. 2 is a schematic top view of the motor of FIG. 1 taken, essentially, along line II—II of FIG. 1 in which, for clarity, the insulating plate carrying the stator winding has been omitted but showing, additionally, the circuit arrangement to commutate the motor current between the two coils of the motor.

General motor construction, FIGS. 1 and 2: A motor shaft 1 has a hub 2 secured thereto by means of a press fit; the hub 2 preferably is in the shape of a belt pulley, made as a metal injection pressure casting. A soft iron or soft magnetic return disk 4 has a central opening 3 thereof secured to the hub 2, for example by being cast integrally therewith. A ring-shaped, axially magnetized ring magnet 5 is secured to disk 4, coaxially with respect to shaft 1. Disk 4 and magnet 5, together with the hub 2, form the upper rotor element 6. The hub 2 is formed with blind bore 7, the inner surface of which functions as a bearing surface 8 for a bearing tube 9 seated on shaft 1 with slight axial play. This construction is compact in an axial direction. The axial distance between the surface 8 and the surface 12 facing the axial air gap 11, and defined by the dimension arrow 10, is constructed with small tolerance. The bearing tube 9 is made of sintered metal and is tapered at its ends to formal journal or slide bearings 13, 14. The enlarged central portion 15 of the bearing tube 9 is secured, with a press fit, to a flanged disk 16 on which a stator plate 18 is secured at the side 17 facing away from the rotor assembly 6. The stator plate 18 is made of a plastic insulating material formed with cut-outs in which oppositely located coils 19, 20 are secured by an adhesive, for example epoxy, or the like. Two steel washer disks 23, 24 are located between the bearing surface 8 and the upper facing end surface 21 of the tube 9.

The lower rotor disk 25 is formed as a soft magnetic return disk which is secured on shaft 1 with slight play and engages a locking disk 27 secured to shaft 1 in a groove 26 formed thereon. The magnetic return rotor disk 25 is pulled towards disk 4 by the axial attraction of the magnet 5, to securely retain disk 25 against the retaining ring or washer 27. The entire air gap is designated by the dimension arrow 29. The upper distance between rotor and stator is shown at 11, and the lower distance between rotor and stator at 11'. The end surfaces of the bearing tube 9 are unloaded with respect to the axial tension applied by the magnet 5 by the washer 27. A locking disk 32 is applied to the end shaft 1 to secure the return magnet rotor disk 25 against inadvertent removal from the shaft 1.

The entire mechanical construction, which is given only as an example for any one of many possible constructions, is described in the referenced German Disclosure Document DE-OS No. 24 35 356, and does not form part of the present invention.

The difference between the motor of the present invention and motors of the prior art, essentially, is in the arrangement of the magnetization, in particular and specific zones, and the cooperation of the thus magnetized rotor with specifically located and constructed coils. FIG. 2, from which the invention will be particularly apparent, is highly schematic and the mechanical construction of the motor has been largely omitted since it is known.

The rotor 5 of FIG. 2 is a two-pole rotor and can be subdivided into four characteristic zones:

two monopole zones 35, 36 having uniform magnetization throughout their radial extent, and two dipole zones of magnetization 38, 39, having opposite poles of magnetization with respect to their radial extent.

(a) A zone 35 which, throughout its radial and axial extent is magnetized as a north pole, and having an angular extent of about 120°-el; in a two-pole construction, the mechanical degrees and electrical degrees are equal.

(b) A zone 36, magnetized as a south pole, and completely axially as well radially magnetized and extending over about 120°-el;

a first dipole zone 38, extending in the direction of rotation, as indicated by arrow 37, adjacent to the monopole zone 36, and having an angular extent of about 60°-el; and a second dipole zone 39, adjacent to dipole zone 38 and extending, likewise, over about 60°-el, in which the radial position of the poles of magnetization is reversed with respect to that of zone 38. In axial direction, the magnetization of the zones 38, 39 extends throughout the axial dimension of the magnet 5.

The dipole zones 38, 39 are not uniformly magnetized over the entire radial width, as are the monopole zones 35, 36. Rather, the direction of the magnetic field changes along an imaginary radius vector. Thus, the outer ring segment 41 of dipole zone 38 is a south pole, the inner ring segment 42 a north pole; for the dipole zone 39, the outer segment 43 is a north pole and the inner ring segment 44 a south pole. The radial width and/or the magnetization of the respective ring segments is preferably so selected that the magnetic flux of the ring segments 41 and 42 is as equal as possible. Likewise, the magnetic flux to be derived from ring segments 43, 44 should be equal. This equality of flux in the respective segments of the dipole zones is important when uniformity of torque is desired. Any one monopole zone and an adjacent dipole zone cover an arcuate extent of 180°-el, i.e. one pole pitch.

To obtain equality of flux density in the respective poles of the dipole zones, the volume of the magnets thereof should preferably be equal, which means that the radial extent of the inner one of the magnets may be slightly greater than the radial extent of the outer one.

The stator coils 19, 20 of the coreless or air-core stator are approximately sector-shaped, as shown. The magnetically active portions 47, 48 and 49, 50, respectively, which, preferably have a width of between 10° and 50°-el, include an angle of about 120°-el. The active portions extend radially outwardly; the junctions between the zones 35, 36, 38 and 39 are approximately parallel to the active portions of the coils, when the rotor is in a position in which the junctions between adjacent zones and the rotor coils are above each other. As will be described, in actual practice it is preferred to deviate from the geometrically simple sector shape in order to even further improve the uniformity of torque derived from the motor. It has been found particularly suitable, and as shown in the examples, if the width $B_s$ of the open portion or window of the coils extends over approximately 90% of the width $B_m$ of the rotor magnet 5. This relationship is preferred, but not shown in FIG. 2 in order to provide a simplified, more easily analyzed drawing.

The south pole of the monopole zone 36 merges directly with the south pole of the outer ring segment 41 of the dipole zone 38. Likewise, the north pole of the outer ring segment 43 of the dipole 38 merges directly with the north pole of the monopole zone 35. The outer circumference of the rotor magnet 5 thus has a north pole and a south pole, each, extending over about 180° each. A Hall generator 53 is located within the region of the outer portion of the rotor, secured to the stator plate 18. The Hall generator 53 is shown twice in FIG. 2, once in its actual location with respect to the rotor, and once, schematically, in the circuit to which the rotor is connected. The Hall generator, thus, is cyclically exposed to the magnetic field from the respective motor poles. During one half of a revolution it is affected by a north pole and connects the right coil 20; during the other half of revolution, it is affected by the south pole and connects the left coil 19. Transition from a north pole to a south pole causes reduction of the current in one coil and simultaneously increase of current through the other so that, in operation, one or the other of the coils 19 or 20 will have current flow therethrough. This type of commutation is preferably obtained by a differential amplifier circuit, controlled by the Hall generator. Differential amplifier circuits are well known.

The circuit of FIG. 2, and shown connected to the structure and coils illustrated therein, includes two pnp transistors 54, 55 connected as differential amplifiers which, in turn, operate as driver transistors for npn power transistors 56, 57 which, then, control current flow in the windings 19, 20. One connection of the Hall generator 53 leads over a resistor 58 to a positive terminal or bus 59; the other power connection of the Hall generator 53 extends through resistor 60 to the negative or reference bus 61. The emitters of transistors 54, 55 are connected together over a common resistor 64 with positive bus 59. The collector of transistor 54 is connected over resistor 65 with the negative bus 61 and directly to the base of transistor 56, the emitter-collector path is connected between coil 9 and negative bus 61. The collector of transistor 55 is connected over resistor 66 with the bus 61 and further directly to the base of transistor 57, the emitter-collector path of which is connected between coil 20 and negative bus 61. The coils 19, 20 have their other winding ends connected to positive bus 59. The circuit of FIG. 2, as such, is known—see, for example, German Disclosure Document DE-OS No. 24 19 432, FIG. 1, where a similar circuit is used with a different type of motor, however. In motors of small power output it is not necessary to provide a two-stage amplifier circuit; for low-power application, the transistors 56, 57 may be omitted and coils 19, 20 can then be connected radially instead of resistors 65, 66.

Figure 3:
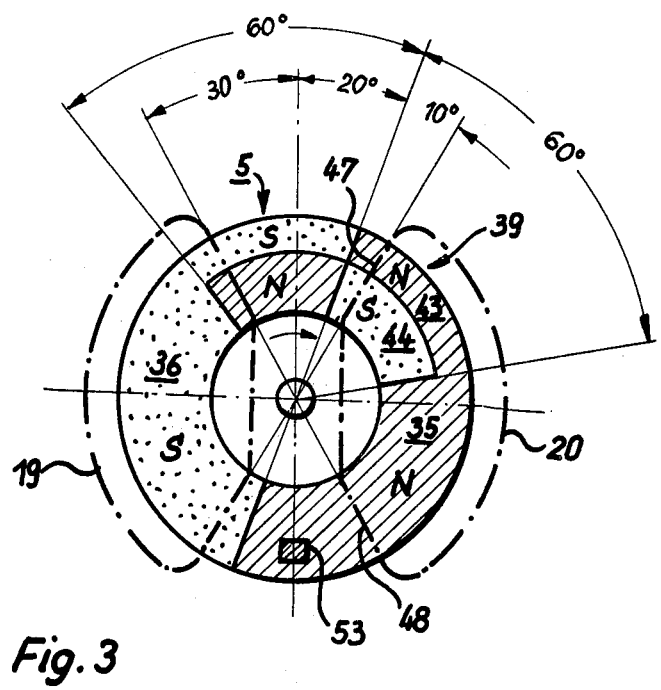
FIGS. 3 and 4 are highly schematic graphic representations of the rotor position with respect to coils as the rotor turns.
Figure 4:
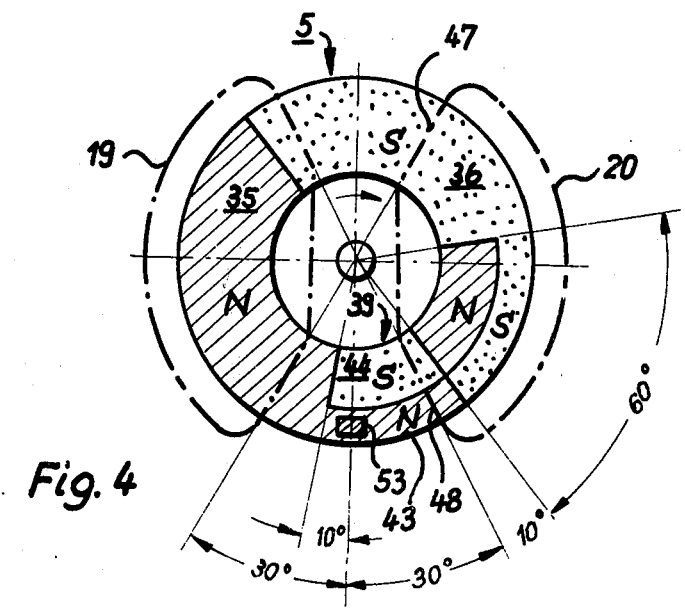

Operation, with reference to the rotor positions illustrated in FIGS. 2–4, and graphs of FIGS. 5 and 6: In the position shown in FIG. 2, transistor 56 is conductive and transistor 57 is blocked, since the Hall generator 53 is within the magnetic field of a south pole, namely monopole 36. Consequently, its left output is more negative than its right output. The direction of rotation of the dynamo electric machine is shown by arrow 37, that is, clockwise.

For purposes of the explanation of the operation, I²R losses and voltage drops due to wire resistances, friction losses and the like will be neglected. These losses can be compensated, for example, by operating the dynamo electric machine as a motor but supplying driving power thereto equal to losses.

Upon rotation of rotor magnet 5 in clockwise direction, see arrow 37, a voltage is induced in coil 20 having the negative amplitude $u_1$ (see FIG. 5). This position corresponds to the time instant $t_0$ (FIG. 5). The voltages induced in coils 19, 20 are shown in FIG. 5 with $u_{19}$ and $u_{20}$. The negative voltage with amplitude $u_1$ can be readily explained by cutting of the magnetic field derived from the two monopoles 35, 36 by the active coil portions 47, 48 so that the voltages induced in the coil portions 47, 48 will add. Since the monopoles 35 and 36, just like coil 20, are approximately 120°-el long, this voltage is induced during an angle of rotation of about 120°-el. The voltages will not cut off in square wave form, but rather will drop off gradually, in rounded form, due to the transition between the poles over the relatively wide width of the coil portions.

FIG. 3 illustrates the position of the rotor 5 upon further rotation. Coil 20 carries current, since Hall generator 53 is opposite a north pole, whereas coil 19 is de-energized, that is, will not carry current. The polarity of the voltage induced in coil 20 is reversed. This voltage $u_2$ will have a center or peak amplitude which has an absolute value $u_2$ which is only about half that of the absolute value of $u_1$, which can readily be explained: The coil portions 48 cross the field lines of the monopole 35, that is, of a north pole. The coil portion 47, however, is influenced by the dipole 39, the opposite magnets 43, 44 of which induce in coil portion 47 voltages of equal magnitude but opposite polarity which, therefore, cancel. The amplitude $u_2$ is thus determined only by the field lines derived from monopole 35 and cutting the coil portion 48; thus, the amplitude is only half that of $u_1$. The rotor position as shown in FIG. 3 occurs at an instant of time indicated in FIG. 5 at $t_1$.

Upon further rotation of rotor 5, it will reach the position shown in FIG. 4. The operation of the coil portions 47, 48 is interchanged. Current continues to flow in coil 20 since Hall generator 53 will continue to be influenced by a north pole, specifically by the north pole of the ring segment 43. The coil portion 47 is now above the south pole monopole 36 and is cut by its field. The dipole 39 of rotor magnet 5 will rotate beneath the coil portion 48 so that, as above described, the amplitude $u_2$ is determined only by the voltage induced in the coil portion 47. The position of FIG. 4 corresponds to the time instant $t_2$ in the graph of FIG. 5.

The voltage waves show a large positive portion having two peaks 68 separated by a dip or valley 69. This non-uniformity between peaks and the dip therebetween can be largely eliminated or compensated by suitable choice of the shape of the coils, as will be described in detail below. The angle of rotation of the rotor during which a voltage with positive amplitude $u_2$ is induced in coil 20 extends over about 240°-el; the transition zone of the voltage shows a rounded curve. This can readily be explained based on physical laws since the time integral of the voltage induced in any one coil, upon rotation over 360°-el, must be zero, unless a d-c source is connected to the coil.

The voltage $u_{20}$ induced in coil 20 is shown in broken lines in FIG. 5; the voltage induced in coil 19, $u_{19}$, is shown in full lines. Due to the symmetry of the arrangement, the wave shapes will have the same appearance.

The voltages $u_{19}$ and $u_{20}$ are idealized, that is, are shown for the case in which the rotor 5 is externally driven and the motor is not connected to a current source. In actual operation, and when connected as a motor, the voltage drops due to wire resistance at the respective current-carrying coils must be added to the voltages shown.

FIG. 5 also shows the overlap of the positive portions of the voltages $u_{19}$ and $u_{20}$. Thus, the condition is present that the motor is subject to a torque at any rotary position of the rotor upon energization of the coils, by energizing that one of the coils or a group of coils in which a positive voltage is being induced. In FIGS. 2–5 each group of coils consists of only one coil element but, as can readily be seen, the same reasoning applies to multiple coils. The torque is given by the relationship $$m \cdot \omega = u_{ind} \cdot i \qquad (1)$$

wherein $u_{ind}$ is the induced voltage which is induced in any one instant in a coil, in accordance with the above description; the i the then instantaneously flowing current through the coil; m the torque applied to the motor and $\omega$ the angular speed of the rotor.

In order to obtain a uniform torque it is necessary that the current for the motor is commutated at the proper instant between coils 19 and 20. Commutation should be done in such a manner that current in one coil, or group of coils if the coils 19, 20 are provided in groups, increases upon commutation when it is decreasing in the other coil, or group of coils, in order to ensure reliable starting at any rotary position of the rotor after the motor has stopped. Overlap of currents at the commutating instant can be obtained, of course, in many ways, for example as taught in the prior art exemplified, for example, by German Disclosure Document DE-OS No. 25 55 055, particularly FIG. 4b thereof, showing overlap of the currents. Digital technology can be used to ensure reliable starting, but the torque is less uniform and thus requires increased mechanical damping, such as inertia wheels or the like. Digital technology may use, for example, bistable multivibrators and the like.

The commutating instants are shown in FIG. 5 at $t_3$, $t_4$, $t_5$, and they correspond to those rotor positions at which the Hall generator 53 is affected by a transition of flux between a south pole and a north pole. The Hall generator 53 is located on a line of symmetry 65 between the coils 19, 20, and spaced from the center of the shaft 1 by a radial distance 66. The distance 66, in a first example, is so selected that Hall generator 53 is affected only by the ring segments 41, 43 of the dipoles 38, 39 and by the monopoles, but not by the ring segments 42, 44 of the dipoles 38, 39. The ring segments 41, 43 of the dipoles 38, 39 need have only a sufficient width to suitably control the Hall generator 53 to conduction in the respective direction. In FIG. 6, graphs a and b show the two Hall voltages $u_A$ and $U_B$ at the two outputs of the Hall generator 53 with respect to rotor position, that is, with respect to instantaneous rotor angle $\alpha$. Graph c of FIG. 6 shows the currents $i_{19}$ and $i_{20}$ in the coils 19, 20. By use of a differential amplifier or of a similar circuit, the currents overlap upon commutation. At any one instant of time, at least one of the coils has current, so that the electromagnetically generated torque is developed without gaps and is essentially constant throughout the angular extent of revolution of the rotor. It is, additionally, essentially free of substantial variations. FIG. 6 also illustrates the effect of leakage or stray flux. Due to the greater stray flux of the magnetization device to magnetize the rotor, the flux density in the region of the ring segments 41, 43 will normally be somewhat smaller; this causes a drop in the Hall voltage when the Hall generator is exposed to the flux from those ring segments 41, 43, as illustrated by the step 67, in FIG. 6, graph a. By suitable operation of the amplifier, for example in saturated regions, the motor current will not be influenced thereby, as seen in graph c of FIG. 6. The two Hall voltages $u_A$ and $u_B$ generally have trapeze-shaped wave forms over about 180°-el. The magnetic flux density is similar since the Hall voltage is proportional thereto. The magnetization of the monopoles—in direction of rotation—also is essentially trapeze shaped. FIG. 6A illustrates, schematically, the connection of Hall generator 53 and the voltage derived therefrom at the respective output terminals.

Figure 7:
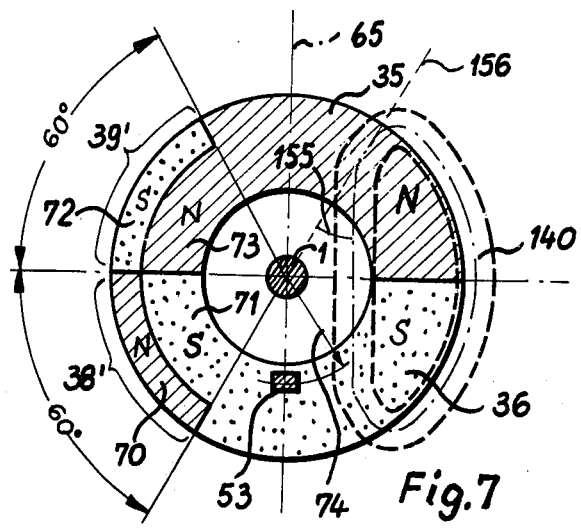
FIG. 7 is a highly schematic top view of an alternate arrangement of rotor magnetization.

It may be desirable, for constructional, geometric, or space reasons, to locate the Hall generator 53 radially further inwardly. For such an arrangement, the polarities of the ring segments 41, 42 and 43, 44 are to be interchanged. FIG. 7 shows this relationship, in which the monopoles 35, 36 are joined to dipoles 38', 39'. Dipole 38' has an outer segment 70 in form of a north pole, an inner segment 71 in form of a south pole. The dipole 39', similarly, has the outer segment 72 in form of a south pole, and the inner segment in form of a north pole. The radial distance 74 of Hall generator 53 form the center of shaft 1 is so selected that the Hall generator 53 will be within the range of rotation beneath the ring segments 71, 73, respectively, that is, within those segments of the dipole which have like polarity of the adjacent monopole.

Other sensors, and particularly galvano magentic sensors, may be used. Hall sensors are preferred in accordance with the present State of the Art because they have two symmetrical outputs and thus permit direct control of current flow through the two coils 19, 20 in a symmetric arrangement. If the motor, for example, would be folded flat along a plane of symmetry 65, coils 19, 20 would fall above each other; these coils are, therefore, mirror images. Sensors such as field plates, magnetic diodes, magnetic field responsive resistors, and the like, may also be used, however, particularly in connection with suitable signal evaluation circuits which provide outputs suitable to control current flow through the respective coils 19, 20.

The specific geometric location at which a torque is generated and applied to the rotor 5 changes, as is clearly apparent from the above description, and particularly in connection with FIGS. 2–4. Torque can be generated only at a location at which a current-carrying, magnetically active coil portion is in flux linkage relationship with a monopole of the rotor 5. In FIG. 3, for example, torque is generated at the coil section 48; in FIG. 4 at coil section 47, and in FIG. 2 a transition occurs between coil section 50 to coil section 49. This change of the location of the generation of the torque places high requirements on the bearing with which rotor 5 is held. The bearing may have only very slight play since, otherwise, bearing noise may result.

In a preferred form, the motor has more than two poles, and at least four poles should be used. The number of poles in the examples given herein, as well as in other examples, of course is related to the number of monopoles.

Figure 8:
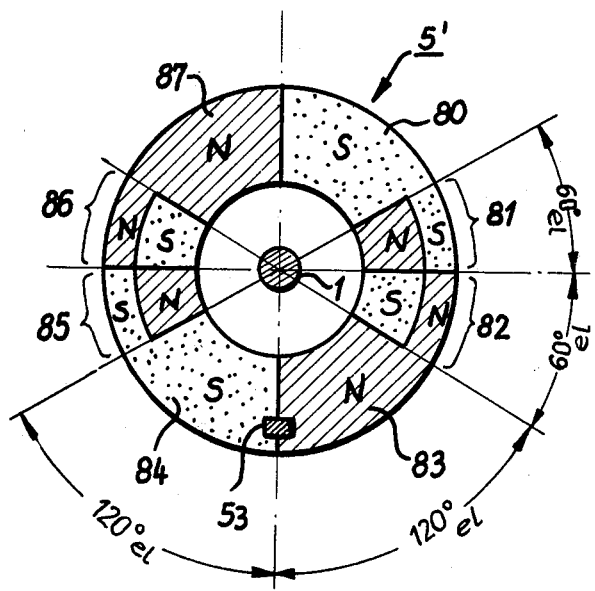
FIG. 8 is a highly schematic top view of rotor magnetization for a four-pole axial air gap motor.
Figure 9:
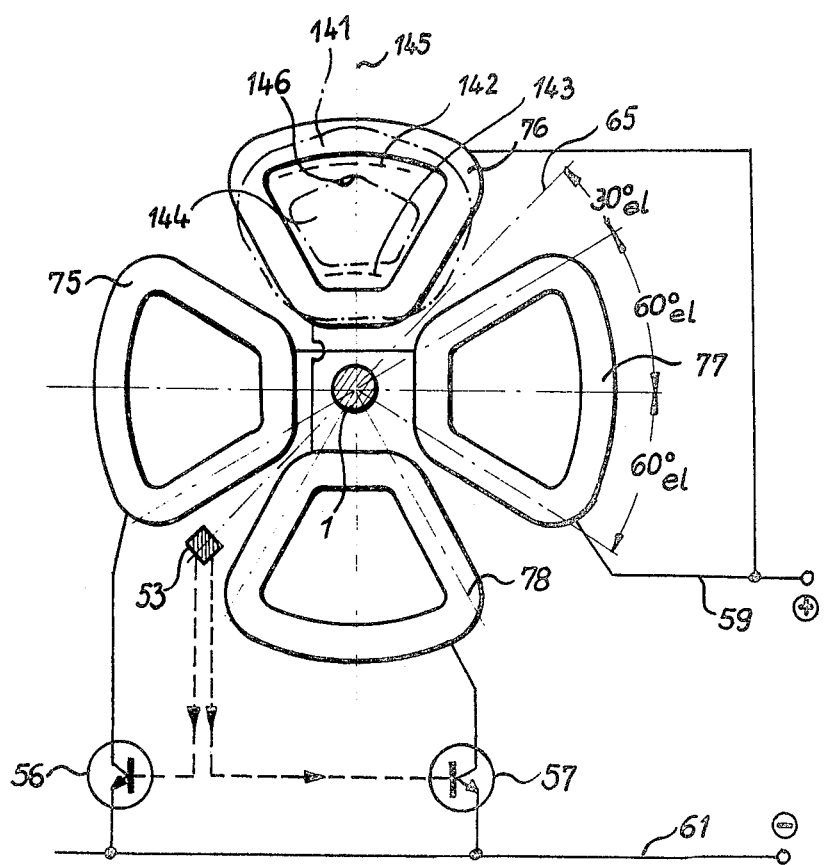
FIG. 9 is a highly schematic view of the coil arrangement, and a simplified control circuit for the rotor of FIG. 8.

FIGS. 8 and 9 illustrate a motor arrangement with four monopoles in an axial air gap motor. The forces which are applied by the stator to the rotor, at any instant of time, are symmetrical with respect to the rotor shaft 1 so that cyclically, rhythmically varying lateral forces applied to the bearings of shaft 1 are compensated and the requirements of accuracy and strength being placed on the bearing can be reduced. Similar parts and elements operating similarly to those previously described have been given the same reference numerals and will not be described again.

The mechanical construction of the motor of FIGS. 8 and 9 is essentially similar to that of FIG. 1; the respective angles are shown in FIGS. 8 and 9.

The relationship of the various elements around the circumference of the motor, that is, the angular position, is clear from FIGS. 8 and 9 and a verbal description therefore is omitted to prevent redundancy. As illustrated in FIG. 9, the stator construction is also symmetrical with respect to a plane of symmetry 65. Hall generator 53 is located in that plane 65. Two coils are serially connected in the same direction of winding. To simplify the illustration, the details of the circuit between the Hall generator 53 and the power transistors 56, 57 have been omitted, only the end stages 56, 57 being shown. The circuit can be identical to that of FIG. 2. The four coils 75, 76, 77, 78 have the same number of turns and are essentially trapeze shaped. The magnetically active portions of the coils have an approximate angular distance of about 120°-el from each other and extend essentially radially. When transistor 56 is conductive, current will flow from the positive bus 59 through coils 77, 75 and then transistor 56 to negative bus 61; upon conduction of transistor 57, current will flow from positive bus 59 through coils 76, 78 and through the conductive transistor 57 to negative bus 61. The currents are controlled by the Hall generator 53, commutation being effected after each rotation about 180°-el. In a four-pole motor, current is commutated four times for each revolution.

The rotor 5' is shown in top representation in FIG. 8. Using the customary clock notation, then a first monopole zone 80 forming a south pole extends from the 12 o'clock to the 2 o'clock position, followed by a dipole zone between the 2 and 3 o'clock position having an outer south and an inner north pole. The dipole zone 81 is joined to a second dipole zone 82 of reversed polarity between the 3 o'clock and 4 o'clock position, and then joined to another monopole 83 between the 4 o'clock and 6 o'clock position. The remaining sections of the monopoles 84, 87 and the dipoles 85, 86 are obvious from FIG. 7. The various angles are shown in FIG. 8. The flux generated in the dipole zones by the respective north and south poles thereof should be the same.

The electrical angles of the motor in accordance with FIGS. 8 and 9 and of that in accordance with FIGS. 1 to 4 are the same. Thus, the operation will be identical, particularly the shape of the voltage induced in the motor when not carrying current, as illustrated in FIG. 5. The groups of the coils 75, 77 and 76, 78 are connected when the voltage with lower amplitude $u_2$ is induced therein; they are retained in connection for about 180°-el, that is, a quarter revolution. During the next quarter revolution, the spool group 76, 78 is connected after the prior connection of the spools 75, 77, and so on, in cyclical variation. The torque, that is, the drive forces acting on the rotor 5', is always generated at two radially oppositely located positions which, of course, change in the manner described in connection with FIGS. 1–4. Rhythmically changing lateral forces acting on the bearings are avoided, however, thus ensuring quieter running and less wear and tear mechanically. This feature is generally applicable to all motors having more than two poles, that is, monopoles, in which the principles of the present invention are used.

The present invention is suitable for all types of motors, that is, whether of the axial air gap or cylindrical air gap type; motors having a cylindrical air gap can, additionally, be subdivided into motors having an external stator and an internal rotor, or an external rotor and an internal stator. The mechanical construction of cylindrical air gap motors is well known and the present invention is applicable to many types; it will be described, specifically, with respect to a motor illustrated, generally, in U.S. Pat. No. 3,703,221, assigned to the assignee of the present invention. The invention may be applied to two-pole, that is monopole motors, as well as motors having a multiple of two-hole pairs.

Figure 10:
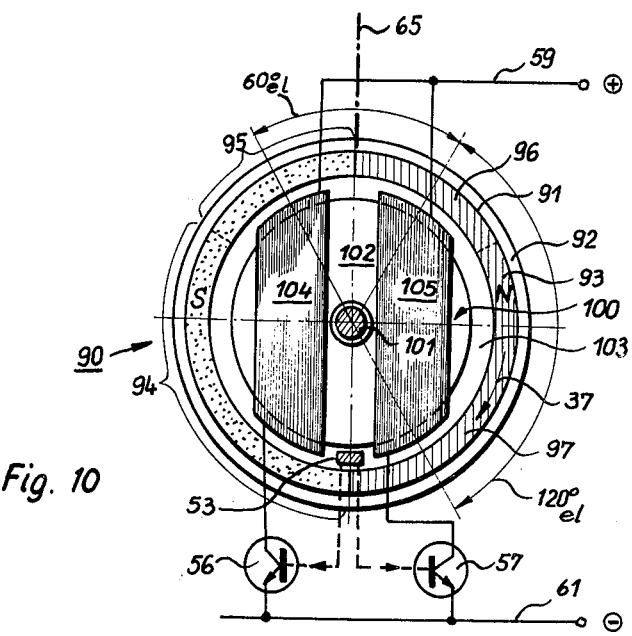
FIG. 10 is a transverse cross section, perpendicular to the axis of rotation, of a two-pole external rotor motor having a cylindrical air gap.
Figure 11:
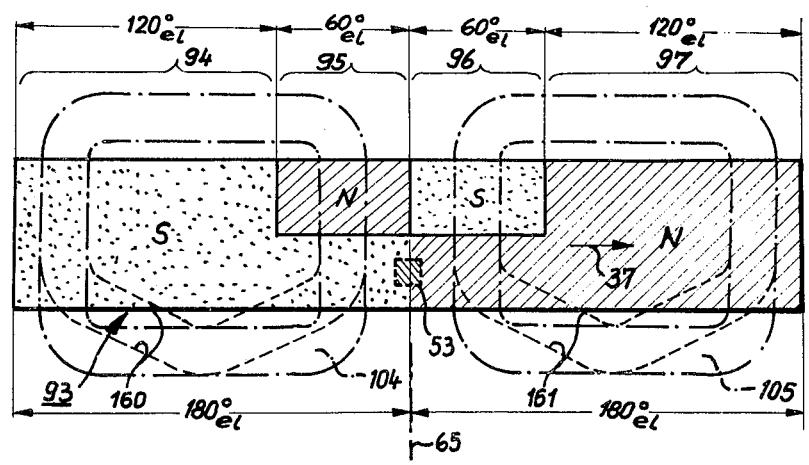
FIG. 11 is a developed view of the rotor of FIG. 10 with a schematic illustration of the stator coils superimposed.

Embodiment of FIGS. 10 and 11: A two-pole external rotor motor 90 has an external rotor 91 with an outer carrying ring 92 made of soft iron magnetic, that is, soft magnetic material. A ring magnet 93 is secured within the support element 92. The ring magnet is, for example, made of a flexible plastic material, typically a rubbery material, having magnetic particles located therein. Such structures are known as rubber magnets. The rubber magnet can be secured to the support 92 by an adhesive. The rubber magnet, and its magnetization, is shown in developed form in FIG. 11. Considering FIG. 11, first, from left to right: A monopole zone 94 forming a south pole is positioned adjacent a dipole zone 95 with an upper north pole and a lower south pole; adjacent thereto is a dipole zone 96, with reversed polarity, and followed by a monopole zone 97. In the motor of FIG. 10, the north pole of zone 95 is not visible since it is located behind the south pole, the view being from the bottom of FIG. 11 upwardly.

Hall generator 53 is located in the plane of symmetry 65 of the stator 100. The rotor shaft 101 is journalled in suitable and well-known manner in the center of the stator 100. The stator itself is made of a laminated core 102 having an outer circular cylindrical circumference. Together with the rotor magnet 93 it defines an air gap 103 which has the same width at all circumferential positions, so that reluctance torques are avoided, that is, rotor 91 will not have any specific magnetically determined preferred position. The two stator coils 104, 105 are mirror images with respect to the plane of symmetry 65. They are indicated in chain-dotted lines in the development of FIG. 11. It is desirable to slightly offset Hall generator 53 counter the direction of rotation, as indicated by arrow 37, FIG. 10, from the plane of symmetry 65 in high-speed motors.

The magnetically active coil sections of both coils include an angle of about 120°-el; the coils 104, 105 are adhered to the circular stator, since the stator winding is applied to a slotless or smooth stator core. Hall generator 53 is located within the circle of rotation of the rotor and so positioned that change-over the Hall generator occurs after each revolution extending over 180°-el, that is, in FIG. 11 at the lower portion of the path of rotation to be acted on by the monopoles and the like-poled dipoles. The Hall generator is affected at each 180°-el, first by a south pole and during the next half revolution—with respect to electrical degrees—by a north pole. The south pole of monopole zone 94 merges directly with the south pole of the dipole zone 95; the north pole of the monopole zone 97 merges directly with the north pole of the dipole zone 96.

The output transistors 56, 57 only of the circuit of FIG. 2 are shown in FIG. 10; these output transistors are controlled by the Hall generator similar to the above description in connection with FIG. 2. The operation is the same as previously described. FIG. 11 corresponds practically identically to FIG. 2 with the only difference that the straight magnetic path shown in the developed form of FIG. 11, is bent in ring shape, and the coils, similarly, then become sector-shaped.

The two-pole motor of FIGS. 10 and 11 is subject to nonsymmetrical bearing forces acting laterally, that is, radially on the bearing. Thus, motors with four or more poles—that is, monopoles—are preferred.

Figure 12:
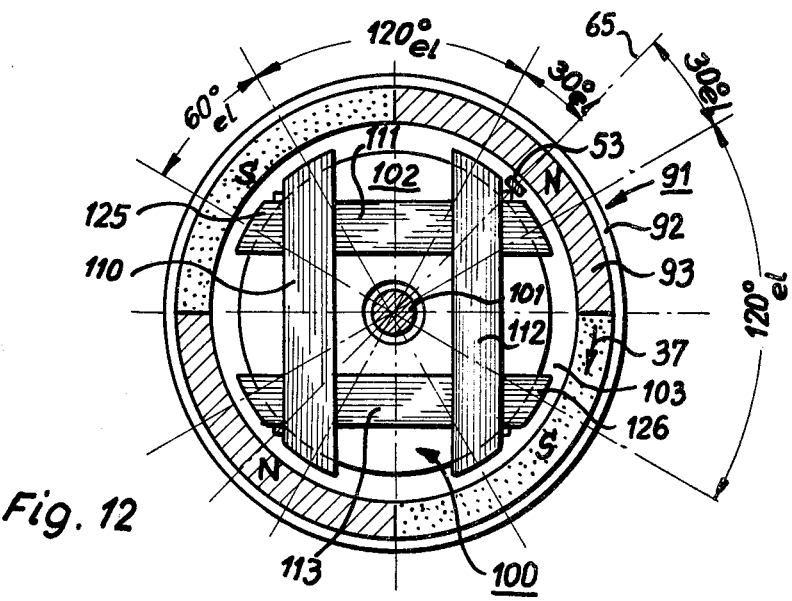
FIG. 12 is a view similar to FIG. 10, but illustrating an arrangement for a four-pole external rotor motor.

Embodiment of FIGS. 12 and 13: Similar parts operating similarly will not be described again and have been given the same reference numerals. FIGS. 12 and 13 show a four-pole motor having a cylindrical air gap 103. The stator core 102, of soft magnetic material, has four coils 110, 111, 112, 113, secured thereon, the magnetically active sections of which, as shown, have a distance from each other of about 240°-el. These four coils are shown in developed form in FIG. 13, together with the rotor magnet and its pattern of magnetization. The coils are connected in series, by serial connection of coil 110 with coil 112 and of coil 111 with coil 113. The connections to the transistors 56, 57 of the circuit of FIG. 2 are likewise shown. The position of Hall generator 53 with respect to the coils is clearly apparent from FIGS. 12 and 13, where the plane of symmetry 65 of the stator is also shown.

The rotor 93 has four monopoles which, each, extend over 120°-el, and four dipoles, each extending over 60°-el. In FIG. 13, and going from left to right, a monopole 116, next a dipole 117 with an upper south and a lower north pole, then a dipole 118 with an upper north and a lower south pole, a south-monopole 119, and north-monopole 120, another dipole 121 with an upper south and a lower north pole, a dipole 122 with reversed polarity, and finally a monopole 123. Since FIG. 13 is a developed figure, the monopole 123 would, in the closed cylinder, be placed adjacent the monopole 116. FIG. 13 clearly shows that all magnetically active coil sections of the coil group having the coils 110, 112 are over monopoles; in this coil group, therefore, the voltage with the amplitude $u_1$ (FIG. 5) is induced. Transistor 56 is blocked by the Hall generator 53 which, as shown, is controlled by the lower path of lower zone of the rotor magnet 93.

The coil group having the coils 111, 113 have the lower voltage $u_2$ induced therein. The transistor 57 is controlled to be conductive. At that instant, thus, a drive torque is generated by the left active coil section 125 of coil 111 and by the left active coil section 126 of coil 113. FIG. 12 clearly shows that the coil sections 125, 126 are diametrically opposite each other, that is, rotor 91 has a drive torque applied thereto which is symmetrical with respect to shaft 101. The same relationship will occur in analogous manner with respect to the other coil sections when they take over the generation of the drive torque.

Figure 14:
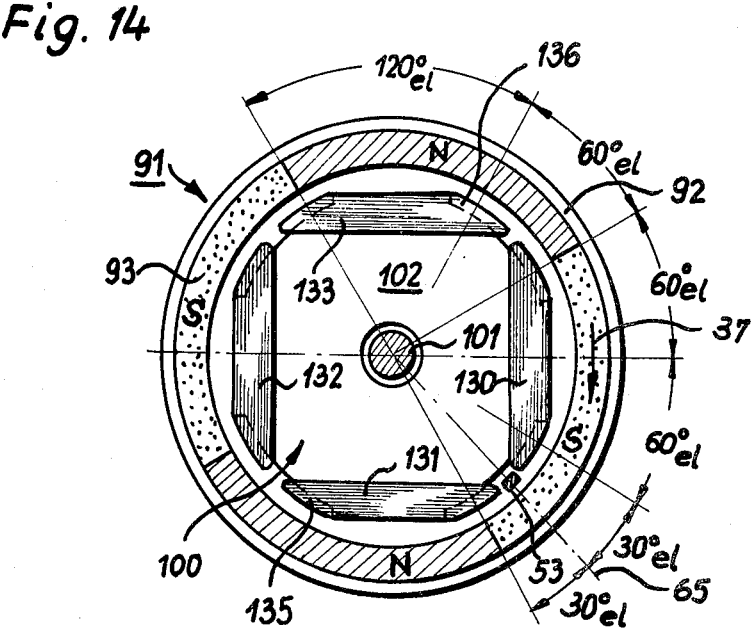
FIG. 14 is a view similar to FIG. 12 showing a different arrangement of coils in a four-pole external rotor motor.
Figure 15:
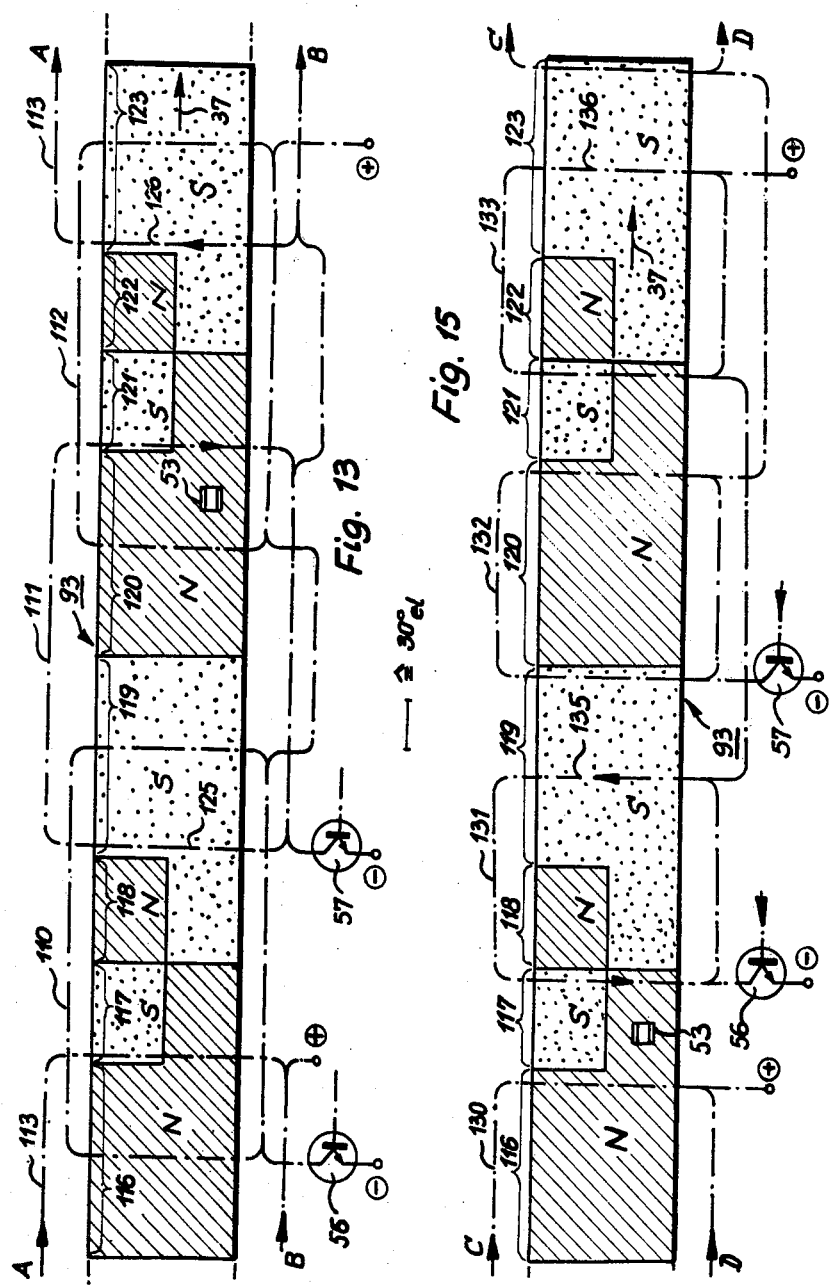
FIG. 15 is a developed view of the rotor and coil arrangement of FIG. 14.

The four coils 110 to 113, as shown in FIG. 12, have a relatively high copper or wire resistance. To reduce the wire resistance, the coil arrangement in accordance with FIG. 14 is preferred. The development of the arrangement of FIG. 14 is shown in FIG. 15. The magnetically inactive coil section, that is, the head ends of the loops, as is clearly seen, are substantially shorter and do not cross. This is particularly important when the motors are to have a short axial length. On the other hand, it is more difficult to wind coils in the shape shown in FIG. 14, and to secure those coils on a slotless stator core structure.

The four coils 130, 131, 132, 133 are symmetrically arranged and are so wound that their magnetically active sections, as shown, have a distance of 120°-el from each other. The development of FIG. 15 is again shown with respect to the rotor magnet 93, which is identical to that shown in FIGS. 12 and 13. Hall generator 53 is also shown in FIG. 15, and its location relative to the coils, as well as the connection of coil 131 and coil 133 to form a first coil group, the current through which is controlled by transistor 56; and the connection of coil 132 and coil 130 to a second coil group, the current through which is controlled by transistor 57.

At the particular instant of rotation shown in FIG. 15, the full voltage $u_2$ is induced in the coil groups 130, 132 since transistor 56 is blocked due to its control by Hall generator 53, whereas transistor 57 is controlled by Hall generator 53 to be conductive. The drive torque is generated by the right active coil section 135 of coil 131 and coil section 136 of coil 133. As clearly seen in FIG. 14, these coil sections are diametrically opposite each other, so that the generated torque again is symmetrical with respect to the shaft 101 and thus does not cause an unsymmetrical loading of the bearings for the rotor 91. Hall generator 53 is located in the region of the lower rotary path of rotor 91. It changes over its conductivity after each 180°-el rotation. The circuit is the same as that in FIG. 2; the connections of the Hall generator to the circuit must be so made, as noted above, that current will only flow in that group of coils in which the lower voltage $+u_2$ is induced, as explained in connection with FIG. 5.

The explanation and showing of the coils and the arrangement results in voltages as shown in FIG. 5 which have the peaks or pips 68, separated by a depression 69. These peaks 68 cause variations in the instantaneous torque m supplied by the motor in accordance with equation (1). Such variations are undesired in many applications, for example if the motor is used to drive audio, video, or data recording equipment. These peaks 68 and the intermediate depression 69 can be avoided if the coils 19, 20; 75–78; 104, 105; 110–113; 130–133 have coil sections which are cut only by the main field of the rotor magnet 5, 5', 93, respectively, but are unaffected by the leakage or stray field therefrom.

The leakage or stray field from the motor, in actual practice, is particularly effective on the outer winding portions of the coils with which the rotor interacts and causes a deformation of the theoretical flat curve, thus inducing the pips 68, shown in FIG. 5. This deformation of the induced voltage, which, when the motor current remains uniform, causes a corresponding variation of the torque which is particularly annoying if the motor is to be used for direct drive of audio equipment, for example phonograph turntables or the like which require output torque of high uniformity.

The effect of leakage flux on the coils can be effectively avoided by deforming the coil shape from the idealized form shown in FIGS. 2, 3, 4, 9, 11, 12, 14, respectively.

The deviation from the idealized coil form is shown in FIG. 2 for the right coil 20 by superimposing thereon the actual, desirable coil form shown in chain-dotted lines 150, 151. The resulting coil, as shown, is approximately a pentagon. This shape is derived by decreasing the coil surface in the region of that portion of the rotary path of the rotor 5 which controls the Hall generator 53, that is, in the embodiment of FIG. 2, the outer region of the rotor. The corners 152, 153 of the coils above or close to that portion of the rotary path of the rotor are cut or chamfered. Identical considerations of course apply for coil 19 of FIG. 2 where the superimposed showing of the actual desirable coil form has been omitted for clarity.

Chamfering or relieving the edges or ends or corners of the coils as shown at 152, 153 slightly decreases the surface of the coil. This results in a decrease in induced voltage and thus is decreased torque derived from the motor. This decrease in torque, desirably, occurs essentially at those positions in which the pips 68 are located, as seen in FIG. 5. The upper envelope of the induced voltage thus has a much lesser degree of waviness or ripple by inclining or relieving the corners 152, 153 of the coil, and the overall torque derived from the motor will become substantially more uniform. By suitable inclination of the corners of the coil it is possible to reduce the remaining waviness or ripple of the torque to a negligible value, keeping the motor current constant, and which is even below the variation in torque of the four-winding, four-pulse brushless d-c motors described, for example, in the "asr" literature reference.

The extent of chamfering or relieving the corners 152, 153 depends on the overall shape of the coil, the magnetization of the rotor, its size and shape, and the quality of magnetization, and the stray field thereof. It is best determined by experiments starting with a coil shape which is approximately that indicated by the chain-dotted lines 150, 151 in FIG. 2, for example, or by measuring the extent of the stray field from a particular rotor construction.

FIG. 7 illustrates the type of coil which is suitable for a motor in which the Hall generator 53 is located at an inner circumferential path of the rotor. A suitable coil form is shown in broken lines at 140 (FIG. 7). The segments 71, 73 of the dipole zones 38', 39' are located radially inwardly. The magnetically active coil sections do not extend radially outwardly through an essential portion of their length, but rather extend under an angle 155 of, for example, about 30° with respect to an intersecting radius vector 156. The radial extent of the coils themseleves has been reduced to about 50 to 60% of the width of the magnets. None of these angles, nor the reduction in length of the magnetically active coil sections is critical. The exact matching of the shape of the coils to a specific rotor for minimum ripple can be easily determined experimentally.

A coil shape 141 for use with a rotor magnet 5' which has been found suitable in actual practice is shown in FIG. 9. The Hall generator 53 is located at a radially external circumferential path of the magnet which is shown in broken lines 142, 143 with respect to the upper coil segments. The open window 144 of the coil corresponds to the preferred relation $B_S:B_M \approx 0.9$. The coil window is approximately in the shape of a pentagon which is symmetrical with respect to a 90° line 145, and which has a tip 146 facing outwardly, that is, towards the circumferential path which also controls the Hall generator 53. The outer shape of the coil 141 is almost circular. This is due to the winding of the coil and has been found suitable in actual practice. Of course, all four coils of the motor will have the shape indicated in chain-dotted lines in FIG. 9, the chain-dotted lines being shown only with respect to the upper coil for clarity of the drawing. An excellent wave shape of the positive induced voltage will be obtained. The wave shape is practically free of pips 68 and the motor has practically no variations in output torque. The foreshortened coil from clearly shows the chamfering or relieving of the outer corners of the coils while retaining the inner shape of the coils substantially unchanged.

Motors with cylindrical air gaps likewise exhibit variations in output torque unless special precautions are taken. Referring to FIG. 11, broken-lines 160, 161 show the actual coil shape—in developed form—as distinguished from the ideal coil shape shown in chain-dotted lines and used in connection with the theoretical explanation of the invention. Again, the coils will have an approximate pentagon shape, the tip of which is directed towards the side of the magnet which controls the Hall generator 53. The rounding or relieving of the corners extends, in accordance with operating experience, usually only to the first quarter of the width of the magnet, as shown in FIGS. 9 and 11. The angle of inclination is a function of the respective width of the poles. Motors having many poles will require a greater extent or angle of inclination than motors with fewer poles. In the examples of FIGS. 12 to 15, the coils should also have the shape indicated in broken lines 160, 161 in FIG. 11, with the tip of the five-corner polygon being directed towards the Hall generator 53 which controls the lower rotary portion of the rotor. The relieving of the corners has not been shown in FIGS. 13 and 15 for clarity in the drawings. If the Hall generator 53 would be controlled from the upper section, then the tip of the pentagon would have to be directed upwardly.

In accordance with a feature of the invention, the particular magnetization of the rotor permits use of the motor as a tachogenerator, or to use the motor in combination with a speed controller.

Speed control is independent of the magnitude of the magnetic flux density of the rotor magnet if frequency of induced voltage is used as a measure of actual speed rather than amplitude. The dynamic characteristic of a controller which uses frequency as a measure for instantaneous speed is that much better, the higher the frequency. The voltage induced in the main winding of a brushless d-c motor in operation upon rotation of the rotor usually has a comparatively low frequency. In the present motor the frequency is:

$$f_{Ui} = p \cdot n / 60 \quad (2)$$

wherein the speed n is measured in rpm, and p is the number of pole pairs of the monopoles. This frequency is often not sufficient for effective speed control, particularly if the speed n is small, which is the case if the motor is to be used as a direct drive motor for a phonograph turntable, record player, or the like, which operates at 33-⅓ rpm.

Figure 16:
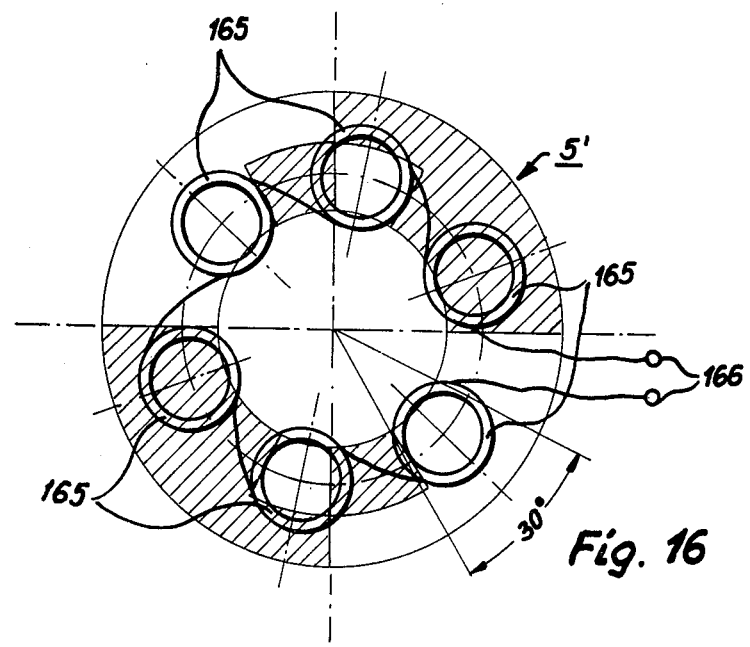
FIG. 16 is a highly schematic representation of a tacho generator winding formed as a lap winding for use with an axial air gap motor, for example of FIGS. 8 and 9.

An output signal is derived from a winding which, when combined with the motor, is an auxiliary winding and located either only in that portion of the air gap of the rotor magnet in which the dipole regions have the reverse polarity as the adjacent monopoles or only in that region of the air gap in which the segments of the dipole which is the same as that of the adjacent monopole. The additional winding can be wound, for example, as a lap winding with three p single coils, in which p is the number of pole pairs of the monopoles. The coils each have a width of 360°/6p, and always the same spacing, that is, for example in a motor having four monopoles (p=2), and six coils, each will have a width of 30°-mechanical, and a distance of 30°-mechanical. Such an arrangement is shown in FIG. 16 for use with a rotor 5' as illustrated in FIG. 8. The specific construction of the rotor has been shown only schematically to clarify the drawing, and reference is made to the discussion in connection with FIG. 8 for a detailed description. The six separate coils 165 have a width of 30°-mechanical and a distance of 30°-mechanical and are placed above the inner rotary portion of rotor 5'. The coils are serially connected. The external connections are shown at 166. A speed control circuit can be connected to terminals 166, which analyzes the frequency of the induced voltage forming the output signal at terminals 166. The form of the tacho generator winding with single coils can be used, equally, in motors having a cylindrical air gap.

Figure 17:
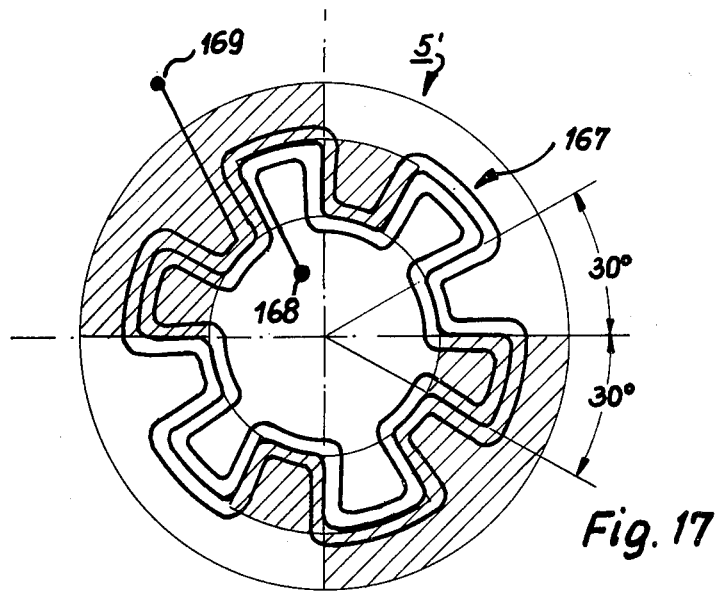
FIG. 17 is a schematic representation of a wave winding used as a tacho generator winding, for use in the axial air gap motor of FIG. 8 or 9, for example.

When using a motor with a flat or axial air gap, a wave winding is suitable which can readily be constructed in form of a meander or undulating winding 167, applied as a printed circuit to a flat plate, and as shown in FIG. 17. The radial sections of the undulating winding have a distance of 360°/6p, that is, in the motor of FIG. 8 having a rotor 5' with four monopoles (p=2), the spacing is 30°-mech.

The undulating winding 167 preferably is secured to a thin insulating foil as a printed circuit, for example applied in a screen printing process and then etched. The inner terminals 168 and 169 are part of the printed circuit. Due to the relatively small number of windings of a printed circuit, it is desirable to amplify the resulting output signal before further processing the signal. The undulating winding of FIG. 17 is so constructed that it is affected only by the inner portion of the rotor 5'. Alternatively, it could be so constructed that it is affected only by the outer portion thereof.

Constructing the winding 167 as a printed circuit has the further advantage that several foils of such undulating windings 167 can be stacked above each other. When using n foils, it is possible to offset the respective windings of the respective foils by 180°-el/n. The degrees are referred to the pole pitch of the meander or undulating winding. Thus, when using two foils for example, which are then offset 90°-el with respect to each other, it is necessary to offset the foil by a mechanical actual angle of 15° with respect to each other. Two 90° offset output voltages are then obtained from the two foils. Upon subsequent full-wave rectification of these voltages, the frequency of the output is doubled once more.

Operation of the tacho winding: Coils 165 or the undulating loops 167 within the region of the monopoles of the rotor 5' have no voltage induced therein as long as there is no change in magnetic flux derived from the monopoles. This is the case in two p coils, or undulating loops, respectively; in FIG. 16 or 17, in four coils or undulating loops. The other p coils have a voltage induced therein. In the example of FIG. 16, voltages are induced in two coils 165 in which the dipole segments change from polarity N to the dipole segments of the polarity S. This change occurs sequentially during one revolution in all three p coils, that is, three p-times for each revolution. The motor having four monopoles thus will have twelve changes although the magnetic flux in the main winding changes only four times for each revolution. A voltage thus is induced in the undulating winding 167 of FIG. 17 or in the three p serially connected separate coils 165 of FIG. 16 which has a small amplitude with respect to that of the main coils, but which has a frequency which is three times that of the voltage induced in the main coil. Since the voltage induced in the measuring windings 165, 167 has a higher frequency, it provides a desirable output signal for a speed control system in which the frequency of rotary induced voltage is used as a control parameter for revolution of the motor.

The auxiliary or tacho winding can be used with any sensor; it is particularly suitable for use when the sensor is a Hall generator, but the tacho winding itself is independent of the commutation sensing device.

The motor can be used not only to provide an essentially uniform output torque, but also output torque which varies in a roughly stepped pattern. By non-uniformly magnetizing the dipole zones, the output torque will fluctuate. It is possible to generate a torque with pronounced stepped wave shape by unequally magnetizing the magnetic areas. Motors with such torque shape are used for some applications in which the output torque should fluctuate or vibrate.

If the motor is to have particularly uniform output torque, then it may be desirable to increase the current through the motor coils at the instant of commutation, that is, at time periods $t_6$, $t_7$, as shown in FIG. 6, graph c, particularly when combined with the arrangements to make the output torque uniform. Supplying the motor with constant current, use of dipole-magnetic regions of uniform, equal flux, and coils with chamfered, relieved corners at the side facing the Hall generator provides highly uniform drive torque. The coil form 140 of FIG. 7, or 141 of FIG. 9 is particularly preferred. A four-pole axial air gap motor with a coil shape as shown at 141 in FIG. 9 provided measured output torque variations of ±10%. These variations occurred essentially at the instant of commutation of the coil currents and these variations can be made even smaller by then suitably modifying the motor current. The high degree of uniformity of output torque which is available makes the motor particularly suitable as a drive motor in audio, particularly phonograph and video use.

The use of Hall generators as galvano magnetic sensors is preferred; these generators are inexpensive and small and permit elimination of additional or accessory devices to control commutation, such as separate control magnets, contacts, induction coils, and the like. The magnetized region within the circumferential path in the dipole zone need only be as wide as required for proper control of such a galvano magnetic sensor.

The preferred form of the invention uses motors which have four or more poles to reduce non-symmetrical loading on the bearings. The coils, when used with axial air gap motors, are preferably coreless or air-core coils; motors with cylindrical air gap, whether for use as an internal or external rotor motor, are preferably applied to a slotless stator, in order to entirely or in any event essentially avoid reluctance torques which cause disturbances and interferences.

Various changes and modifications may be made, and features described in connection with any one of the embodiments may be used with any of the others, within the scope of the inventive concept.

I claim:
1. Brushless d-c motor having
    a stator winding comprising two winding means (19, 20; 75-78; 104, 105; 110-113);
    a permanent magnet rotor having a plurality of poles (6, 91) located in electromagnetic induction relation to the stator winding means;
    current switching control means (56, 67) alternately controlling current flow through the respective winding means;
    sensing means (53) responsive to the position of the rotor with respect to the sensing means, connected to and controlling the switching state of the current switching control means and hence pulsed current flow through the respective winding means;
    wherein, in accordance with the invention,
    the rotor (6, 91), in the area of each pole pitch and interacting with the winding means has, in a first angular zone, monopole magnetization and, in a second angular zone, dipole magnetization;
    said second zone of dipole magnetization having two angular regions (41, 42; 43, 44) which are located radially adjacent each other and extend perpendicularly to the direction of rotation of the rotor;
    and wherein the dipole zones, with respect to adjacent pole pitch regions of the rotor, are located adjacent each other,
    whereby the permanent magnet rotor will be essentially continuously magnetized throughout its circumference with said angular first zones of one magnetic polarity and adjacent angular second zones of dual magnetic polarity.

2. Motor according to claim 1, wherein said current switching control means alternately switch current flow through the respective winding means in the same direction.

3. Motor according to claim 1, wherein the sensing means (53) controls the current switching control means (56, 57) to connect at least one of the stator winding means to a source of energy at any instant of time, during operation of the motor, to provide drive torque to the motor essentially free of gaps.

4. Motor according to claim 1, wherein the range of said first angular zone of monopole magnetization extends over an angle of about 120°-el;
    and the range of the second angular zone of dipole magnetization extends over an angle of about 60°-el.

5. Motor according to claim 1, wherein the dipole zones having a polarity similar to that of an adjacent monopole zone are positioned in the same rotational path.

6. Motor according to claim 1, wherein the dipole zones having a polarity similar to that of an adjacent monopole zone merge with the monopole zone to provide a region of uniform magnetization essentially free from a gap.

7. Motor according to claim 4, wherein the sensor is a galvano magnetic sensor (53) positioned on the stator and located at that rotational path in which the monopole zones and the dipole zones have the same magnetic polarity.

8. Motor according to claim 7, wherein the dipole zones and monopoles zones of the same magnetic polarity merge into each other to provide an essentially uniformly distributed zone of magnetization essentially free from magnetic discontinuities.

9. Motor according to claim 1, wherein the two polarity regions (41, 42) of a dipole zone (38) are dimensioned and arranged to provide an approximately equal magnetic flux—with respect to absolute flux density—in an air gap (29) adjacent the dipole zones.

10. Motor according to claim 7, wherein the magnetization shape of the magnetization of the rotor, measured in a longitudinal direction with respect to rotation of the rotor of a monopole zone (35) and the region (43) of a dipole zone of equal polarity is approximately trapeze-shaped.

11. Motor according to claim 1, wherein the current switching control means (56, 57) provide approximately constant current to the respective winding means during the time that the voltage induced in said winding means upon rotation of the rotor is approximately uniform.

12. Motor according to claim 11, wherein the current switching control means provides a decreasing current ($i_{19}$) to one winding means (19), in the range of commutation of current from one winding means to the other (FIG. 5: $t_3$, $t_4$, $t_5$) while the current ($i_{20}$) in the other winding means is increasing.

13. Motor according to claim 1, wherein the winding means are positioned on the stator such that two magnetically active sections of any one of the winding means, offset from each other by $120°\text{-el} + n \times 360°\text{-el}$, have current flowing therethrough in opposite directions,
wherein n is an integer of 0, 1, 2 . . . .

14. Motor according to claim 1, wherein the winding means have magnetically active sections (FIG. 2: 47, 48, 49, 50) which, upon coincidence with the boundary between two zones of magnetization of the rotor at least in part have a longitudinal extent which is at least approximately parallel to said boundary.

15. Motor according to claim 1, further including a differential amplifier connected between said sensing means (53) and said current switching control means (56, 57) to control commutation of current through said winding means.

16. Motor according to claim 1, wherein said motor is an axial air gap motor, and the stator winding is an air core or coreless winding (18, 19).

17. Motor according to claim 1, wherein the motor is a cylindrical air gap (103) motor, and the stator includes a slotless stator structure (100).

18. Motor according to claim 17, wherein (FIGS. 12, 13) the motor is a four-pole motor having four symmetrically arranged stator coils (110–113); and the respective coils have a winding pitch of about 240°-el.

19. Motor according to claim 17, wherein (FIGS. 14, 15) the motor is a four-pole motor having four symmetrically arranged stator coils (130–133) having a winding pitch of about 120°-el.

20. Motor according to claim 1, wherein the winding means have magnetically active sections, the width of the magnetically active sections being between about 10° to 60°-el.

21. Motor according to claim 1, wherein the winding means of the stator winding (140, 141) have relieved corners by chamfering the corners (152, 153) in those regions in which they are within the rotary path of the region of the rotor in which the polarity of the magnetization of the monopole zones and the adjacent dipole zones is the same.

22. Motor according to claim 21, wherein the stator coils (141; 150, 151; 160, 161) are in the shape of an approximate five-cornered polygon; one tip (146) of the polygon pointing in the direction which is in the rotary path of the rotor (5; 5'; 93) in which the polarity of magnetization of the monopole zones and the adjacent dipole zones is the same.

23. Motor according to claim 1, further including (FIGS. 16, 17) a tacho generator winding (165; 167) located in the air gap (11, 11'; 103) and positioned for magnetic interaction with the flux derived from the region of one magnetic polarity of the dipole zones.

24. Motor according to claim 23, wherein the tacho generator winding is located for magnetic interaction with the flux from the dipole zone having a magnetic polarity which is opposite that of an adjacent monopole zone in the same rotational path.

25. Motor according to claim 23, wherein the tacho generator winding (165) comprises a plurality of serially connected winding loops having the same direction of winding.

26. Motor according to claim 25, wherein at least three p winding loops (165) are provided in a motor having 2 p monopoles.

27. Motor according to claim 26, wherein the winding width of the separate loops (165) of the tacho generator winding is approximately 60°/p.

28. Motor according to claim 23, wherein (FIG. 17) the tacho generator winding (167) is an undulating or meander winding.

29. Motor according to claim 28, wherein the meander winding (167) is an essentially flat meander and the radial sections have a distance of about 60°/p for a motor having 2 p monopoles.

30. Motor according to claim 25, wherein a plurality of meander windings are provided, and the individual ones of said meander windings are electrically and mechanically offset with respect to each other to provide a multi-phase tacho generator system.

* * * * *